United States Patent [19]
Gagnon

[11] Patent Number: 5,810,392
[45] Date of Patent: Sep. 22, 1998

[54] SEAT OCCUPANT SENSING SYSTEM

[75] Inventor: Scott Darrell Gagnon, Plant City, Fla.

[73] Assignee: Breed Automotive Technology, Inc., Tampa, Fla.

[21] Appl. No.: 801,928

[22] Filed: Feb. 15, 1997

[51] Int. Cl.$^6$ ................................................. B60R 21/32
[52] U.S. Cl. .......................................... 280/735; 180/268
[58] Field of Search .............................. 280/735; 180/268

[56] References Cited

U.S. PATENT DOCUMENTS

| | | | |
|---|---|---|---|
| 3,874,474 | 4/1975 | Quantz | 180/268 |
| 4,361,741 | 11/1982 | Leskoverc et al. | 200/85 |
| 4,509,614 | 4/1985 | Bando et al. | 180/273 |
| 4,607,199 | 8/1986 | Krueger et al. | 318/484 |
| 4,633,237 | 12/1986 | Tuchnott et al. | 340/573 |
| 4,655,313 | 4/1987 | Hicks | 180/273 |
| 4,678,058 | 7/1987 | Wooters | 180/273 |
| 4,806,713 | 2/1989 | Krug et al. | 200/85 |
| 5,071,160 | 12/1991 | White et al. | 280/735 |
| 5,074,583 | 12/1991 | Fujita et al. | 280/735 |
| 5,109,945 | 5/1992 | Koga | 180/273 |
| 5,120,980 | 6/1992 | Fontaine | 307/16.1 |
| 5,161,820 | 11/1992 | Vollmer | 280/735 |
| 5,164,709 | 11/1992 | Lamberty et al. | 340/667 |
| 5,172,790 | 12/1992 | Ishikawa et al. | 280/735 |
| 5,232,243 | 8/1993 | Blackburn et al. | 280/732 |
| 5,413,378 | 5/1995 | Steffens, Jr. et al. | 280/735 |
| 5,439,249 | 8/1995 | Steffens, Jr. et al. | 280/735 |
| 5,454,591 | 10/1995 | Mazur et al. | 280/735 |
| 5,466,001 | 11/1995 | Gotomyo et al. | 280/730.1 |
| 5,474,327 | 12/1995 | Schousek | 280/735 |
| 5,481,078 | 1/1996 | Asche | 200/85 |
| 5,494,311 | 2/1996 | Blackburn et al. | 280/735 |
| 5,612,876 | 3/1997 | Zeidler et al. | 364/424 |

FOREIGN PATENT DOCUMENTS

0728636  8/1996  European Pat. Off. .

Primary Examiner—Kenneth R. Rice
Attorney, Agent, or Firm—L. R. Drayer

[57] ABSTRACT

A seat occupant sensing system has at least two sensors interposed between a rigid member and a seat pan member such that the weight supported by a portion of the seat cushion which the rigid member underlies is transferred from the rigid member to the seat pan via said sensors. The sensors sense the magnitude of the force transferred therethrough. A device, such as a microprocessor, processes a signal from the sensors to determine the weight that the portion of the seat cushion which the rigid member underlies is bearing. The signal processing device may control the activation and operation of a safety device such as an airbag or seat belt pretensioner as a function of the presence and weight of a seat occupant.

25 Claims, 8 Drawing Sheets

SEAT OCCUPANT SENSING SYSTEM

The present invention relates to an apparatus for sensing the presence and weight of an occupant of a vehicle seat.

BACKGROUND OF THE INVENTION

Many vehicles are equipped with safety devices such as airbags, seat belt pretensioners and so forth to protect persons occupying various seats in the vehicle. If a seat is unoccupied or is occupied by a person of a particular size, it may not be necessary to activate a safety device associated with that seat. Furthermore, if a seat is occupied by a person of a particular size the manner in which a safety device is employed may be varied accordingly. One indicator of the size of a seat occupant is his or her weight. In the case of an infant, the combined weight of the infant and an infant safety seat is useful as an indicator of occupant size.

SUMMARY OF THE INVENTION

There is provided in accordance with one aspect of the present invention a seat occupant sensing system comprising: (a) a seat pan; (b) a rigid member disposed vertically above said seat pan in a spaced apart vertically juxtaposed relationship with said seat pan, said rigid member underlying a portion of a seat cushion; and (c) at least two sensors interposed between the rigid member and the seat pan such that all of the force transferred from the rigid member to the seat pan is transferred via said sensors which sense the magnitude of the force transferred therethrough and send signals to a device which processes said signals to determine the weight that said portion of the seat cushion is bearing.

There is provided in accordance with another aspect of the present invention a seat occupant sensing system comprising: (a) a seat having a seat support member and a seat pan member fastened to one another; (b) a frame disposed vertically above said seat pan in a spaced apart vertically juxtaposed relationship with said seat pan, said frame underlying a portion of a seat cushion; and (c) at least two sensors interposed between the frame and the seat pan such that all of the force transferred from the frame to the seat pan is transferred via said sensors which sense the magnitude of the force transferred therethrough and send signals to a device which processes said signals to determine the weight that said portion of the seat cushion is bearing.

There is provided in accordance with yet another aspect of the present invention a seat occupant sensing system comprising: (a) a seat having a seat support member and a seat pan member fastened to one another; (b) a frame disposed vertically above said seat pan in a spaced apart vertically juxtaposed relationship with said seat pan, said frame underlying a portion of a seat cushion, said portion of the seat cushion being spaced apart from a rear edge of the seat cushion; and (c) at least two sensors interposed between the frame and the seat pan such that all of the force transferred from the frame to the seat pan is transferred via said sensors which sense the magnitude of the force transferred therethrough and send signals to a device which processes said signals to determine the weight that said portion of the seat cushion is bearing.

There is provided in accordance with yet another aspect of the present invention a seat occupant sensing system comprising: (a) a seat having a seat support member and a seat pan member fastened to one another; (b) a frame disposed vertically above said seat pan in a spaced apart vertically juxtaposed relationship with said seat pan, said frame underlying a portion of a seat cushion, the frame and the seat pan being at least partially retained in said vertically juxtaposed relationship by a tension member; (c) at least two sensors interposed between the frame and the seat pan such that all of the force transferred from the frame to the seat pan is transferred via said sensors which sense the magnitude of the force transferred therethrough and send signals to a device which processes said signals to determine the weight that said portion of the seat cushion is bearing; and (d) a controller which processes a signal from said weight determining device to control the activation of at least one safety device for an occupant of said seat based upon said weight.

There is provided in accordance with yet another aspect of the present invention a kit for retrofitting a vehicle seat with a seat occupant sensor system comprising a frame having a plurality of sensors mounted thereon in locations which correspond to a vertically uppermost surface of a vehicle seat pan and a device which processes signals from said systems to determine the weight that is located above and resting upon said frame.

DISCUSSION OF THE PRIOR ART

U.S. Pat. No. 5,232,243 and U.S. Pat. No. 5,494,311 teach a seat occupant sensor that is a piezoelectric film which is rigidly mounted to a substantially inflexible bottom portion of the seat. A plurality of sensing elements are arranged in rows and columns forming an array. U.S. Pat. No. 5,454,591 teaches the use of this sensor to determine if a vehicle seat is occupied by an occupant weighing up to 40 pounds (about 18.2 kilograms) or more than 40 pounds (about 18.2 kilograms) and send an appropriate signal to a safety device control unit.

U.S. Pat. No. 5,474,327 teaches a seat occupant presence, weight and position sensor system wherein a plurality of sensors are located in the seat base just beneath the seat cover and some pressure is exerted on the sensors by the seat cover. The preferred sensors are mounted between polymer sheets and include a pair of conductive electrodes about 2.54 centimeters (1 inch) in diameter separated by carbon layers such that resistance between electrodes decreases as pressure increases.

U.S. Pat. No. 5,161,820 teaches a seat occupant sensor which is a switch, preferably a flat mat-like contact switch wherein two contact layers are separated by an intermediate elastically deformable, electrically conductive layer. The contact switch is mechanically activated when the seat occupant compresses the intermediate layer and completes a conductive pathway for the switching circuit. The use of a simple physical contact switch or a condenser-type switch is also disclosed. However, the seat structure incorporating any of these switches is not shown in the drawings or described in the specification. The seat occupant sensor taught in this patent employs sensors located both in the seat and in the floor in front of the seat.

U.S. Pat. No. 4,678,058 teaches a vehicle seat switch assembly including a generally C-shaped spring located underneath the seat cushion. The end portions of the spring are displaced laterally when the spring is depressed when the seat is occupied. The lateral displacement of the spring ends pulls a switch plunger to close the switch.

U.S. Pat. No. 5,413,378 and U.S. Pat. No. 5,439,249 teach the use of an occupant weight sensor located in or on a structure that includes a seat cushion. The exact structure and operation of the occupant weight sensor is not disclosed in either of these patents. U.S. Pat. No. 5,466,001 teaches the use of sensors embedded in a seat cushion and seat back to sense occupant presence, but the structure of the sensors is not disclosed. U.S. Pat. No. 5,109,945 also teaches the use of a seat switch to detect a seat occupant but does not disclose the structure of the switch or the manner of incorporating the switch into the seat.

U.S. Pat. No. 5,481,078 teaches a set occupant sensor wherein the seat rails pivot about their forward end against leaf springs designed to support the seat weight plus a known fraction of the occupant's weight so that the rear of the seat is raised when the seat is unoccupied. When the seat is occupied, the rear of the seat moves down and an electronic sensor detects seat position to provide a position signal. U.S. Pat. No. 4,655,313, U.S. Pat. No. 4,361,741 and U.S. Pat. No. 4,509,614 also teach a vehicle seat switch used with a seat which pivots relative to the front of the seat cushion.

U.S. Pat. No. 5,120,980 teaches a foam seat cushion confining wire mesh electrical switch closing contacts. U.S. Pat. No. 5,164,709 teaches a seat occupant sensor which is a lateral-force-sensitive cable laid in a meandering pattern foamed into the seat cushion.

U.S. Pat. No. 4,806,713 teaches a seat-contact switch for generating a "seat occupied" signal when a seat suspension approaches a seat frame as a result of seat loading. An articulatable device is fastened on one end to the seat suspension and on the other end to the seat frame. U.S. Pat. No. 4,607,199 teaches the use of a seat switch in conjunction with a microprocessor to disable operation of a vehicle if the seat occupant is out of position for a given period of time. The switch structure and manner of incorporating the switch into the seat are not disclosed.

EP 0 728 636 A1 teaches the use of a switch sensor switch disposed in a seat base but does not disclose the switch structure and manner of incorporating the switch into the seat.

U.S. Pat. No. 4,633,237 teaches an occupant sensor for a hospital bed including a plurality of sensors defining interstices of a matrix of such sensors. The matrix is woven into a mat for placement on a bed in which a patient is confined.

BRIEF DESCRIPTION OF THE DRAWINGS

The invention may take physical form in certain parts and arrangement of parts, a preferred embodiment of which will be described in detail in this description and illustrated in the accompanying drawings which form a part hereof and wherein.

DETAILED DESCRIPTION OF THE INVENTION

Figure 1:
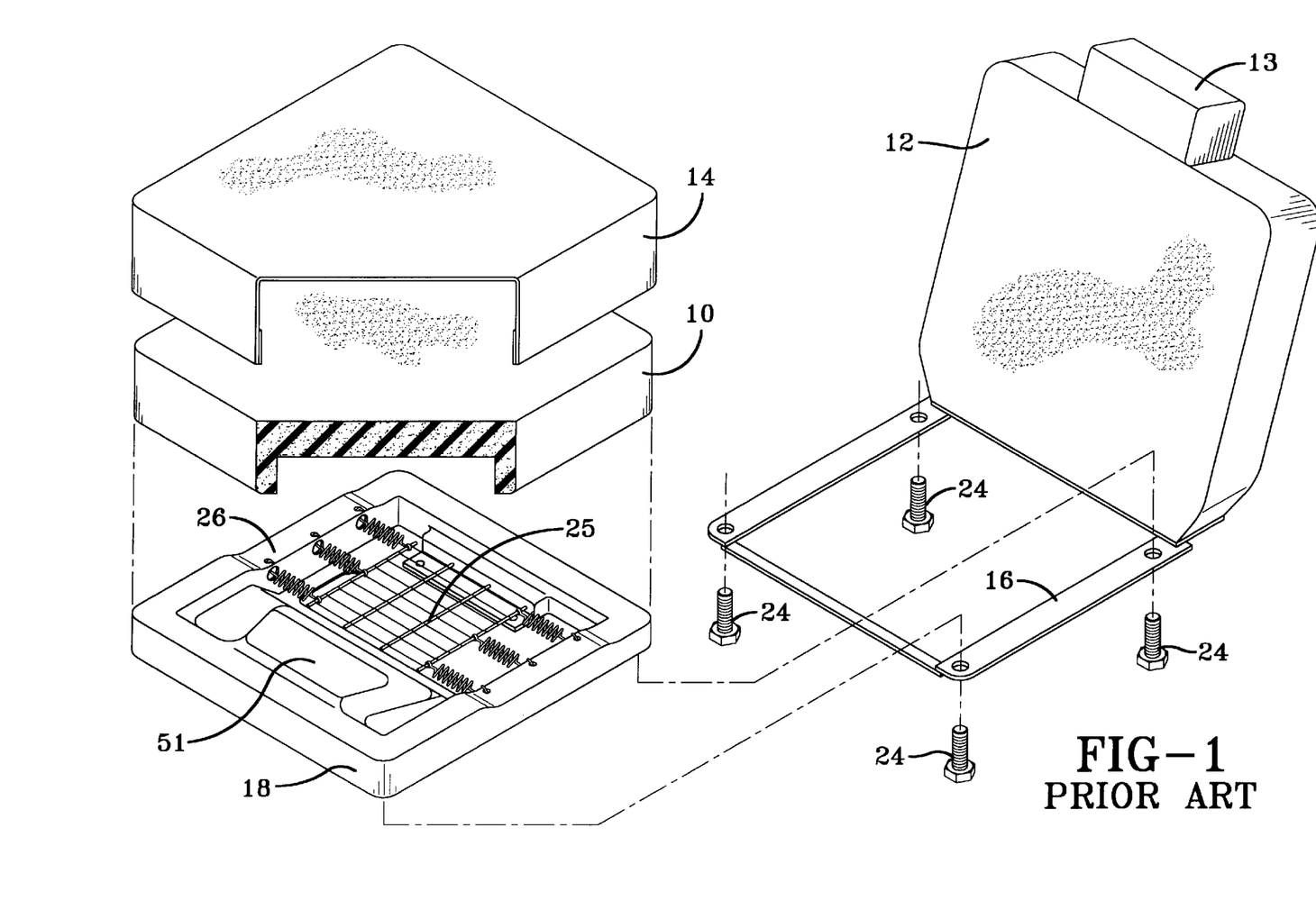
FIG. 1 is an exploded view of a typical prior art vehicle seat.

Referring first to FIG. 1 there is shown an exploded view of a typical prior art vehicle seat. A vehicle seat has a seat cushion 10 and a seat back 12. The seat back may have a head rest 13 associated therewith. The seat back may be pivotally attached to the remainder of the seat. The seat cushion 10 is made of a comfortable, supportive but compressible material, for example foam rubber. The seat has a rigid seat support member 16, sometimes referred to as the seat frame. The rigid seat support member may be unitary, as shown in FIG. 1, with a cross member extending between two side rails, or the side rails may only be joined to one another by the seat back and maintained parallel to one another by fastening the seat frame to legs which extend between seat frame and the floor of the vehicle.

Figure 2:
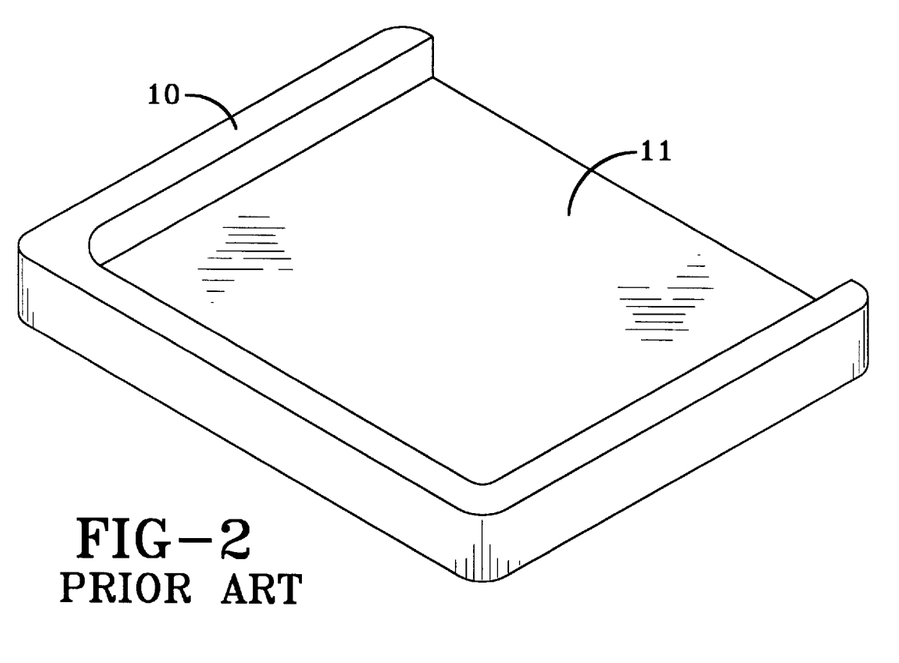
FIG. 2 is a perspective view of the bottom side of a prior art seat cushion used with the prior art seat shown in FIG. 1.
Figure 3:
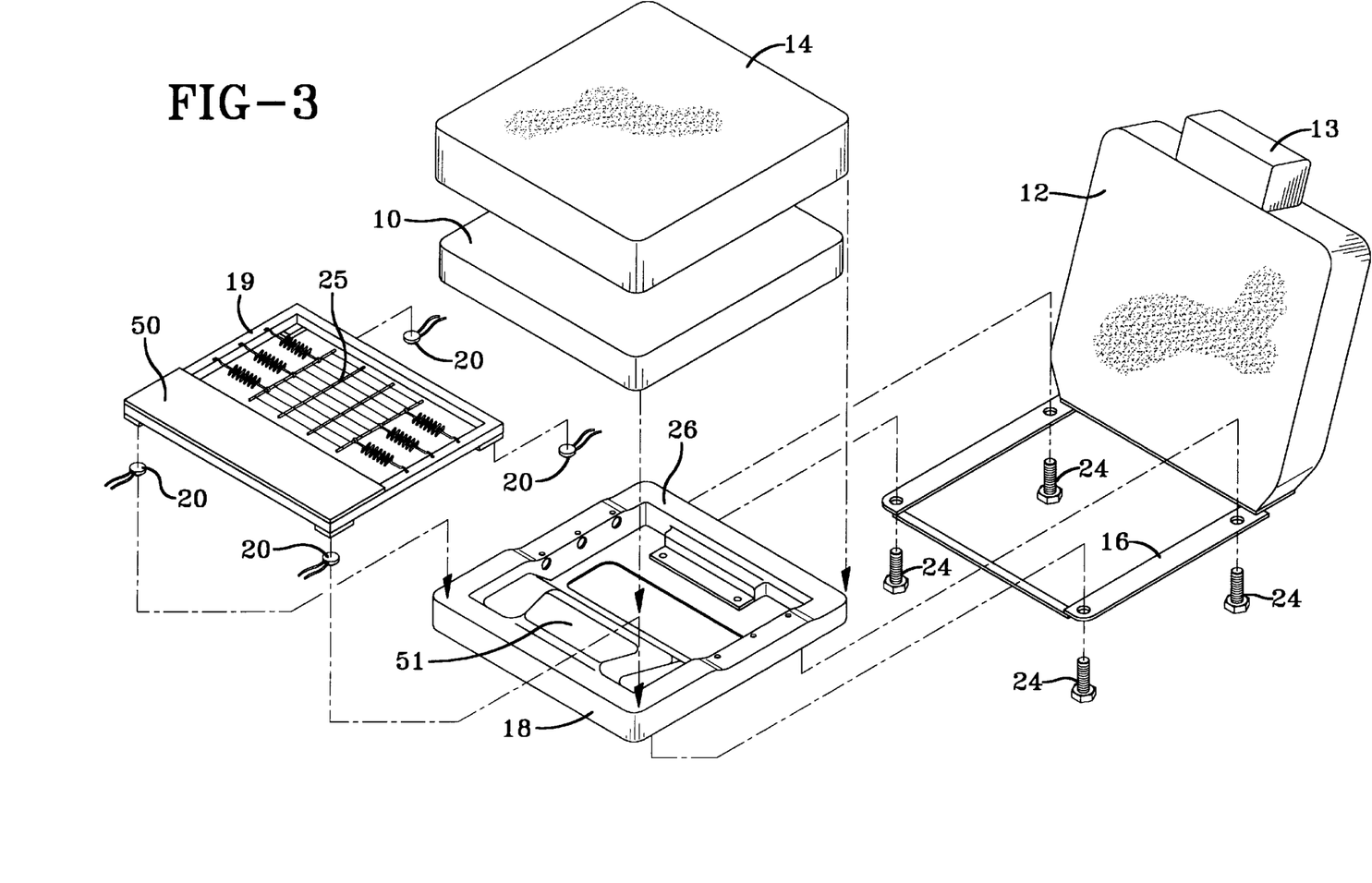
FIG. 3 is an exploded view of a vehicle seat equipped with an occupant sensing apparatus in accordance with the present invention.

A seat pan 18 supports the seat cushion 10, which is adapted to be secured thereto by having bottom side 11 that is contoured, as shown in FIG. 2, to be complementary to the seat pan 18. The seat pan has a generally rectangular shape which may be adapted to the design of a particular seat cushion and seat frame. As shown in FIG. 1 the perimeter of the seat pan is bent to form peripheral walls which may, or may not, have a second horizontal portion associated therewith. A supportive cushioning elastic structure comprising 25 comprising springs and straps, or any other suitable support members, extends across the opening in the seat pan 18 to provide support for the seat cushion 10.

The seat frame 16 and the seat pan 18 are fastened to one another in a vertically juxtaposed relationship. In this example the means for fastening the rigid seat support member and the seat pan 18 to one another are a plurality of threaded fasteners 24. The threaded fasteners do not extend through the uppermost surface 26 of the seat pan, but rather are attached to the seat pan in depressions located in the upper surface of the seat pan or attach to a lower horizontally extending portion of the seat pan. The upholstery 14 is a sheet material which overlies the seat cushion 10 and is secured to the seat pan 18. Examples of sheet materials used as upholstery are fabrics, vinyls and leathers.

Referring next to FIGS. 3 to 6 there are shown exploded, front elevation, side elevation and top views, respectively, of a vehicle seat equipped with an occupant sensing apparatus in accordance with the present invention. Of course it is understood that the design of various structural components of a vehicle seat can vary from one make and model of vehicle to another, with the vehicle seat shown being merely exemplary of a vehicle seat that may be employed in the practice of the present invention. The present invention does, however, apply to seats in general and may be employed not only with vehicle seats but also any seat where it is desired to ascertain whether or not the seat is occupied and the weight of a seat occupant.

Figure 5:
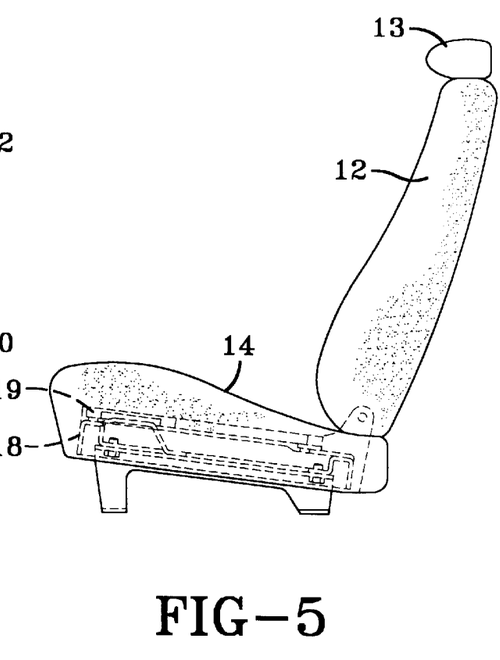
FIG. 5 is a side elevation view of a vehicle seat equipped with an occupant sensing apparatus in accordance with the present invention.

As in the prior art the vehicle seat has a seat cushion 10 and a seat back 12. The seat back may have a head rest 13 associated therewith. The seat back may be pivotally attached to the remainder of the seat, as best seen in FIG. 5. As in the prior art the seat cushion 10 is made of a comfortable, supportive but compressible material, for example foam rubber. The seat frame 16 is substantially like the prior art seat frame described above with reference to FIG. 1.

The seat pan 18 which supports the seat cushion 10 is substantially like the seat pan described above with respect to FIG. 1 and is attached to the seat frame 16 using threaded fasteners 24 in substantially the same manner as described above. The upholstery 14, as in the prior art, is a sheet material overlying the seat cushion 10 and secured to the seat pan 18. An advantage of the seat occupant sensing system of the present invention is that this system may be retrofitted to a prior art vehicle seat.

Figure 7A:
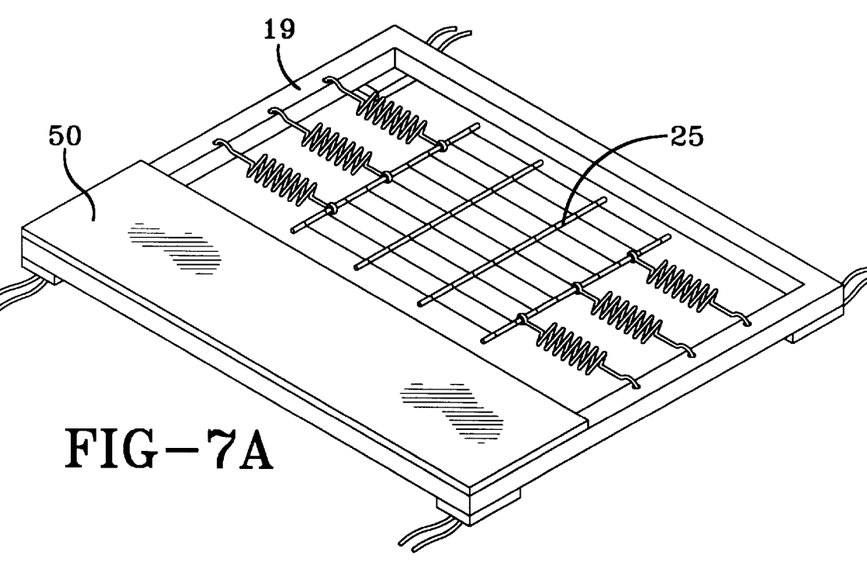
FIG. 7A is a perspective view of the top side of a frame with sensors mounted thereon.
Figure 7B:
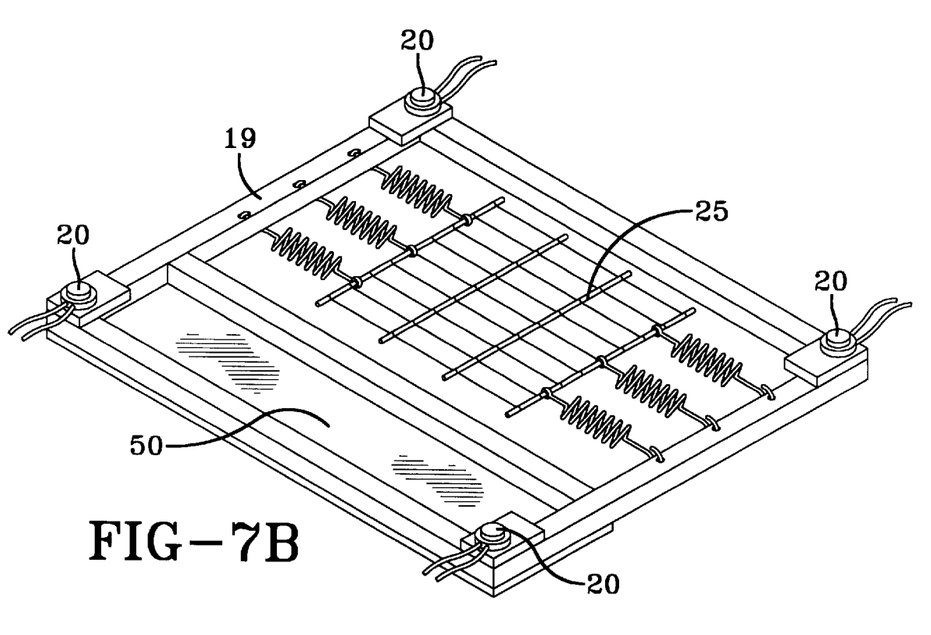
FIG. 7B is a perspective view of the bottom side of a frame with sensors mounted thereon.

A seat occupant sensing system of the present invention has a seat pan 18 with a rigid member 19 disposed vertically above said seat pan in a spaced apart vertically juxtaposed relationship with the seat pan. Referring next to FIGS. 7A and 7B there are shown perspective views of the top side and bottom side, respectively, of a frame 19 with sensors 20 mounted thereon. In the embodiment illustrated in FIGS. 7A and 7B the rigid member 19 is a frame which has a generally rectangular shape and a sensor 20 is located in the vicinity of each corner of the frame. The supportive cushioning elastic structure 25 comprising springs and straps, or any other suitable support members, which in the prior art extends across the opening in the seat pan 18 to provide support for the seat cushion 10 instead extends across the frame 19. This feature prevents the springs from contacting both the seat pan and the frame, therefore potentially transferring forces from the frame to the seat pan.

Figure 6:
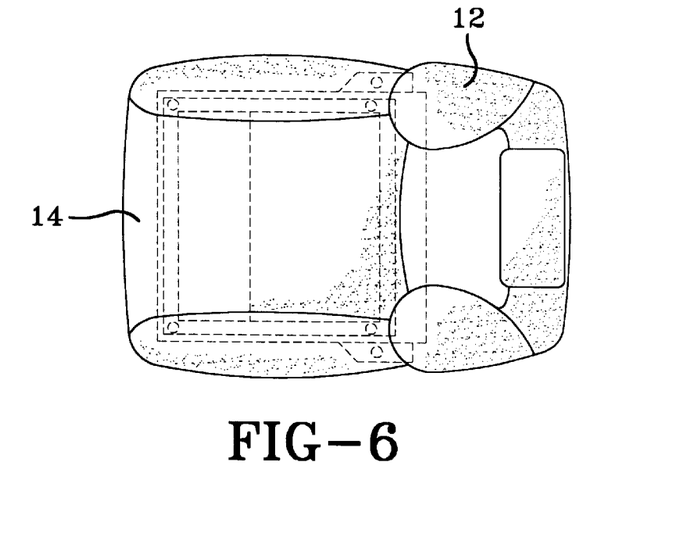
FIG. 6 is a top view of a vehicle seat equipped with an occupant sensing apparatus in accordance with the present invention.
Figure 8:
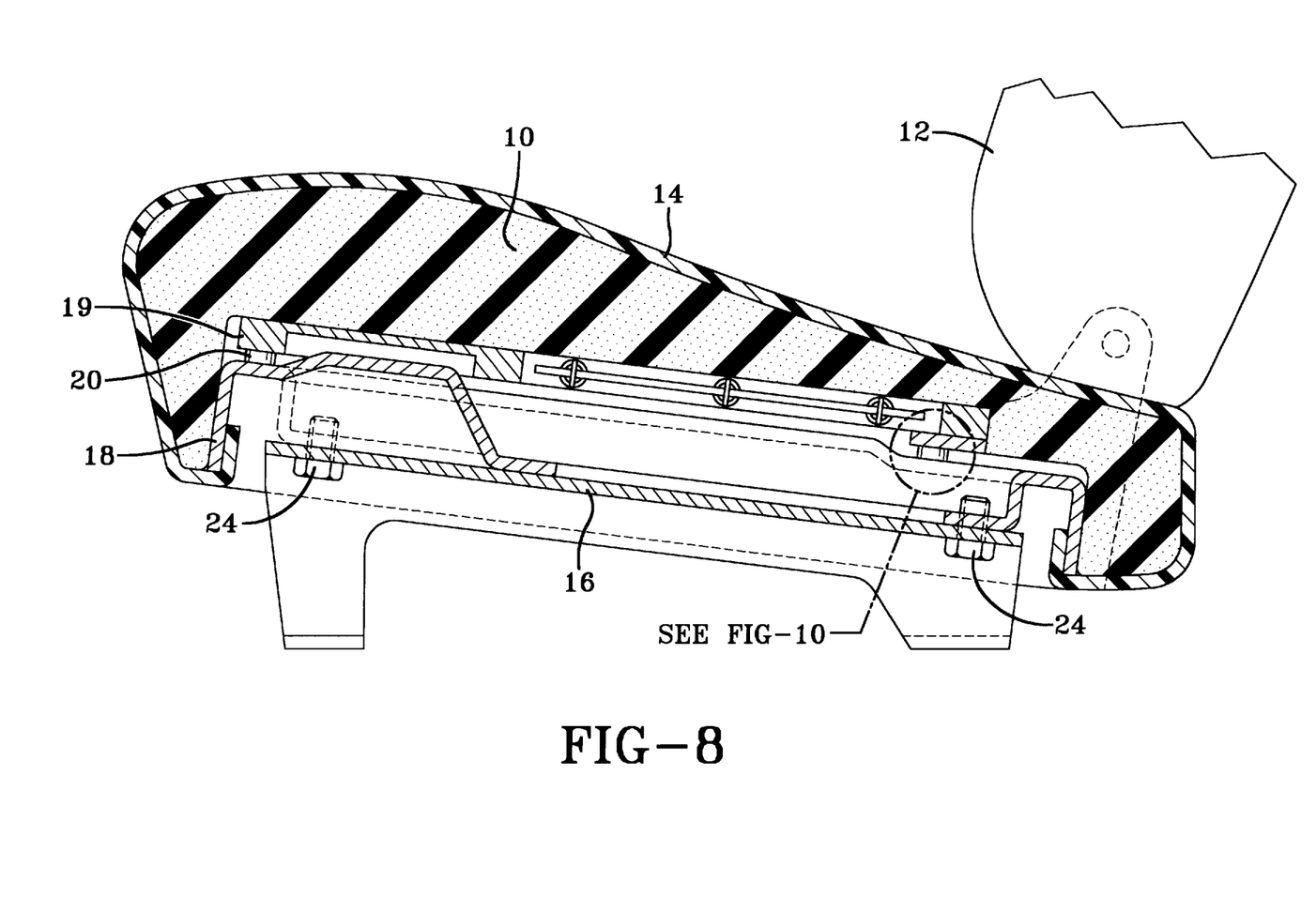
FIG. 8 is a cross-sectional side view, taken along line 8—8 of FIG. 4, of a vehicle seat equipped with an occupant sensing apparatus in accordance with the present invention.

As shown in FIGS. 5, 6 and 8 the rigid member 19 underlies a portion of the seat cushion 10 and may be made of any suitable material such as steel or aluminum. In the embodiment shown the frame 19 includes a plate 50 which is located to be complementary to the anti-submarining portion 51 of the seat pan 18. The anti-submarining portion of a seat pan restricts the tendency of a belted seat occupant to slide forward during a rapid deceleration of the vehicle.

At least two sensors 20 are interposed between the rigid member 19, or frame, and the seat pan 18 such that all of the force transferred from the rigid member to the seat pan is transferred via the sensors. The sensors sense the magnitude of the force transferred therethrough and send signals to a device (not shown) which processes the signals to determine the weight that the portion of the seat cushion which the rigid member 19 underlies is bearing. Each sensor 20 may be for example a strain gauge, a load cell or a variable resistance pressure sensor. A working prototype of a vehicle seat equipped with an occupant sensing apparatus in accordance with the present invention employed four sensors which were Model 14 compression only subminiature load cells purchased from Sensotec, Inc. of 1200 Chesapeke Avenue, Columbus, Ohio U.S.A. These sensors had a range of either 45.4 kilograms (100 pounds) or 113.5 kilograms (250 pounds) and a seat could be equipped with only one size sensor or a combination of sizes. For example, 113.5 kilogram sensors could be used towards the front of the seat and 45.4 kilogram sensors could be used towards the rear of the seat. The height of these sensors is 3.8 millimeters (0.15 inch). If desired, at least one of the sensors may be one type of sensors, while the other sensor(s) may be another type of sensor.

If the surface of the rigid member 19 which is proximal to a sensor 20 is not substantially flat, it is desirable with these commercially available sensors to place a shim of some sort between the sensor and the rigid member to improve the transfer of forces from the rigid member to the sensor. The installation of the seat occupant sensing system into the seat is preferably facilitated by securing the sensors in place on the rigid member (frame) and thereafter placing the resultant assembly in a vertically juxtaposed relationship with the seat pan, with the sensors resting on the vertically uppermost surface of the seat pan 18.

Figure 10:
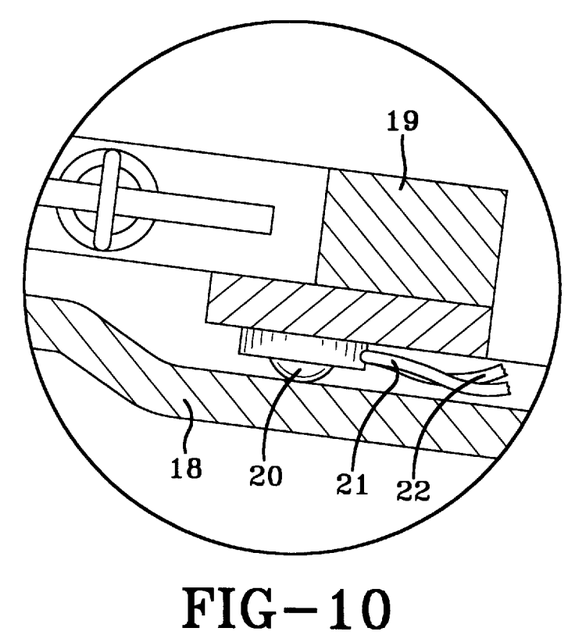
FIG. 10 is an enlarged fragmentary view of a sensor located between rigid components of a vehicle seat equipped with an occupant sensing apparatus in accordance with the present invention.

As shown in FIG. 10, which is an enlarged fragmentary view, at the location indicated in FIG. 8, of a sensor 20 located between the rigid member 19 and the seat pan 18, each sensor has a plurality of electrical leads 21,22 extending therefrom for communicating with a device (not shown) which processes said signals to determine the weight that the portion of the seat cushion which the rigid member underlies is bearing. The vertically spaced apart relationship of the rigid member 19 (frame) and the seat pan 18 is illustrated very well in FIG. 10. The distance that the rigid member (frame) is spaced apart from the seat pan 18 is the height of the sensor disposed therebetween.

Figure 4:
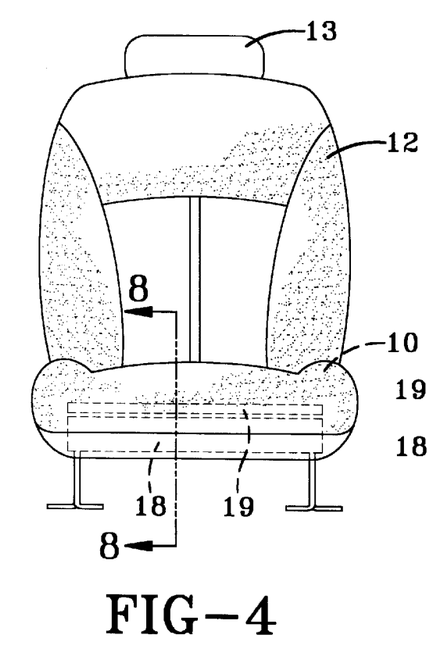
FIG. 4 is a front elevation view of a vehicle seat equipped with an occupant sensing apparatus in accordance with the present invention.

As shown in FIG. 8, which is a cross-sectional side view, taken along line 8—8 of FIG. 4, the portion of the seat cushion 10 which the rigid member 19 underlies is preferably spaced apart from a rear edge of the seat cushion. This feature minimizes the sensing of forces which are transferred from the seat back to the seat pan 18 via the sensors. This is important in the instance where a person seated in the rear seat of an automobile leans against the back of the front seat and could influence the forces transferred to the seat pan. It has been demonstrated that the seat occupant sensing system of the present invention is capable of determining the presence and weight of a seat occupant with good accuracy.

The rigid member 19 and the seat pan 18 are at least partially retained in said vertically juxtaposed relationship by a tension member. In the embodiment shown in the drawings the tension member is a sheet material 14 overlying the seat cushion 10 and secured to the seat pan 18. The sheet material is commonly referred to as the seat cover or upholstery. As shown in FIG. 8 the perimeter of the sheet material may have clips or a deformable strip associated therewith which can clip onto or be bent around an edge of the seat pan.

Figure 9:
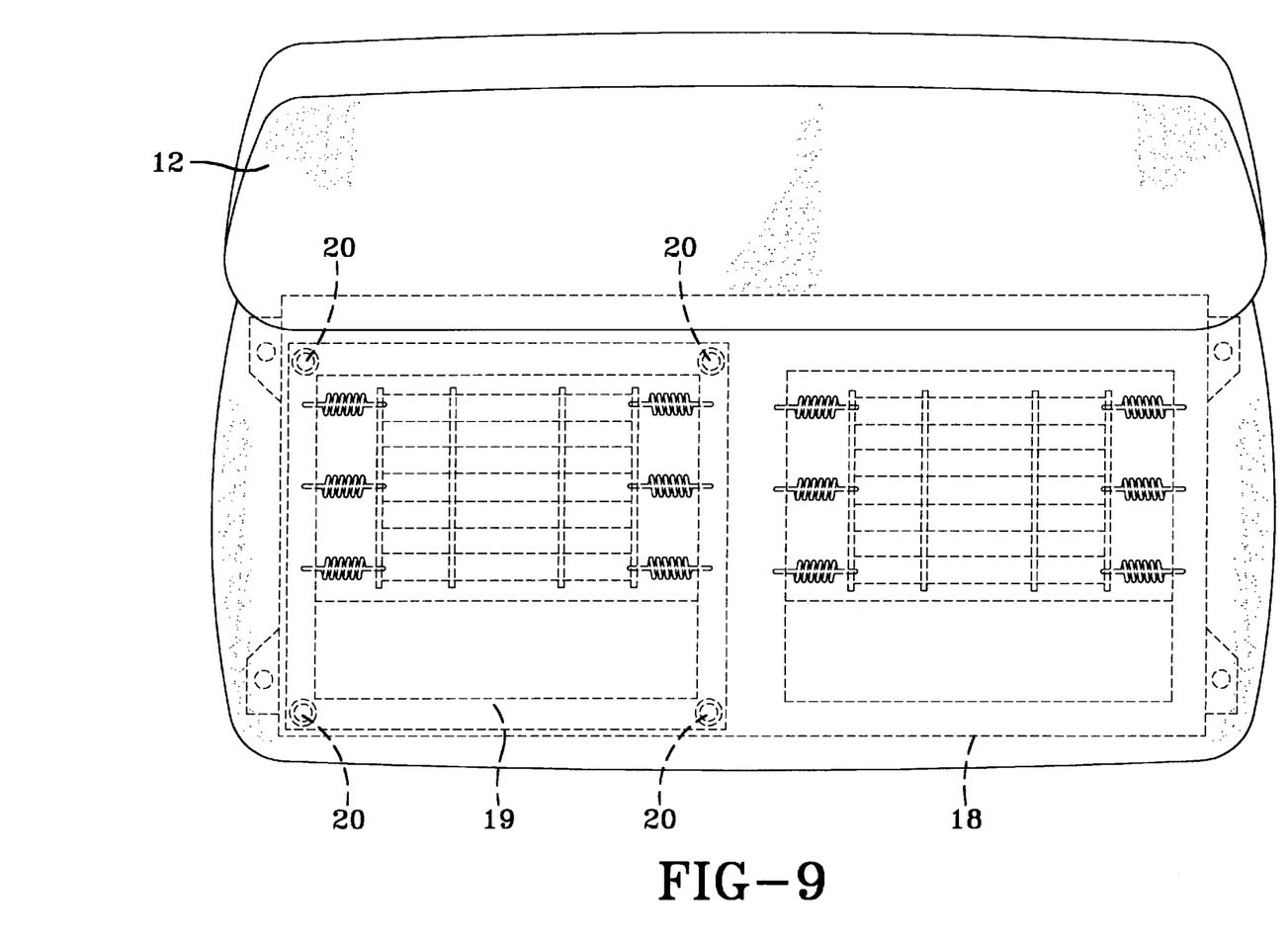
FIG. 9 is a top view of a vehicle bench type vehicle seat equipped with an occupant sensing apparatus in accordance with the present invention.

Referring next to FIG. 9 there is shown a top view of a vehicle bench type seat equipped with an occupant sensing apparatus employing a rigid member 19 and sensors 20 in accordance with the present invention. If it is desired to determine the presence and size of an occupant of the passenger side of a front bench seat of a vehicle, the occupant sensing system of the present invention may be incorporated into only the passenger side of the bench seat as illustrated in FIG. 9.

Figure 11:
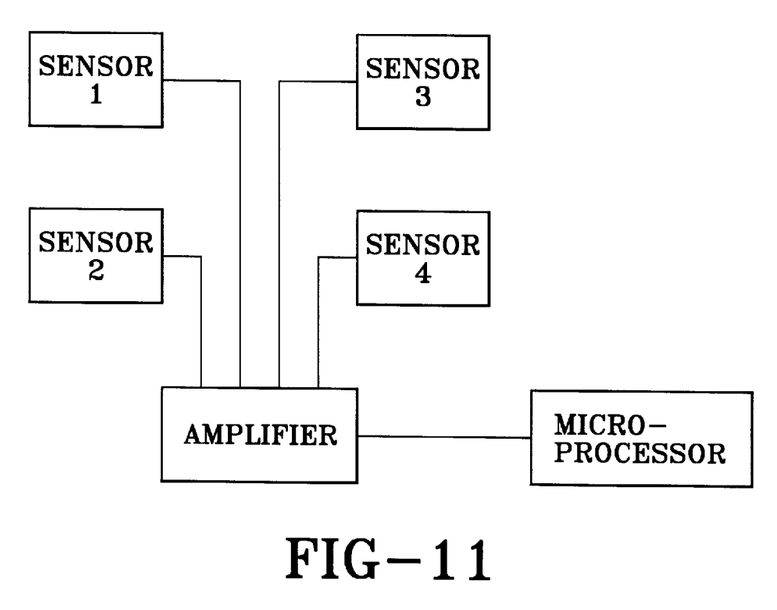
FIG. 11 is a schematic view of an occupant sensing apparatus in accordance with the present invention.

Referring next to FIG. 11 there is shown a schematic view of an occupant sensing apparatus in accordance with the present invention. A signal from each sensor is passed through an amplifier to a device, such as a microprocessor which processes the signal, or signals, to determine the weight that the rigid seat pan member is bearing. Algorithms to translate a signal to a weight are well known and are used for example in electronic bathroom scales. The algorithm must take into account the weight of the seat cushion and the rigid seat pan member in determining the weight of the seat occupant. Of course if the weight of the seat occupant is determined to be zero, the seat is unoccupied.

There is a need in the field of inflatable vehicle occupant restraints, such as airbags, to determine if the occupant of the front passenger seat of a motor vehicle equipped with a front passenger side airbag is an infant in an infant seat or a small child weighing less than a preselected amount. The device, such as a microprocessor which determines the weight that the rigid seat pan is bearing is preferably a controller which controls the activation of at least one safety device for an occupant of the seat based upon said weight. The controller controls, for example, the activation of an inflatable vehicle occupant restraint or a seat belt pretensioner. Additionally the controller may control the manner in which an activated safety device operates, for example controlling the speed at which an airbag is inflated or the amount of seat belt slack which is to be taken up by a pretensioner. Thus, the seat occupant sensing system disclosed herein may determine the presence or absence of an object or person on a seat cushion, and the weight of the person or object on a seat cushion and based upon those determinations may activate one or more safety devices, and/or the manner in which an activated safety device should operate.

While certain representative embodiments and details have been presented for the purpose of illustrating the invention, it will be apparent to those skilled in the art that various changes and modifications may be made therein without departing from the spirit and scope of the invention.

I claim:

1. A seat occupant sensing system comprising:
   (a) a seat pan;
   (b) a rigid member disposed vertically above said seat pan in a spaced apart vertically juxtaposed relationship with said seat pan, said rigid member underlying a portion of a seat cushion; and
   (c) at least two sensors interposed between the rigid member and the seat pan such that all of the force transferred from the rigid member to the seat pan is transferred via said sensors which sense the magnitude of the force transferred therethrough and send signals to a device which processes said signals to determine the weight that said portion of the seat cushion is bearing.

2. A seat occupant sensing system according to claim 1 wherein the rigid member has a generally rectangular shape and a sensor is located in the vicinity of each corner of the rigid member.

3. A seat occupant sensing system according to claim 1 wherein at least one of said sensors is a strain gauge.

4. A seat occupant sensing system according to claim 2 wherein at least one of said sensors is a strain gauge.

5. A seat occupant sensing system according to claim 1 wherein said at least one of said sensors is a load cell.

6. A seat occupant sensing system according to claim 2 wherein at lest one of said sensors is a load cell.

7. A seat occupant sensing system according to claim 1 wherein at least one of said sensors is a variable resistance pressure sensor.

8. A seat occupant sensing system according to claim 2 wherein at least one of said sensors is a variable resistance pressure sensor.

9. A seat occupant sensing system according to claim 1 wherein the rigid member and the seat pan are at least partially retained in said vertically juxtaposed relationship by a tension member.

10. A seat occupant sensing system according to claim 1 wherein said tension member is a sheet material overlying the seat cushion and secured to the seat pan.

11. A seat occupant sensing system comprising:
    (a) a seat having a seat support member and a seat pan member fastened to one another;
    (b) a frame disposed vertically above said seat pan in a spaced apart vertically juxtaposed relationship with said seat pan, said frame underlying a portion of a seat cushion; and
    (c) at least two sensors interposed between the frame and the seat pan such that all of the force transferred from the frame to the seat pan is transferred via said sensors which sense the magnitude of the force transferred therethrough and send signals to a device which processes said signals to determine the weight that said portion of the seat cushion is bearing.

12. A seat occupant sensing system according to claim 11 wherein said system further comprises a controller which processes a signal from said weight determining device to control the activation of at least one safety device for an occupant of said seat based upon said weight.

13. A seat occupant sensing system according to claim 12 wherein the controller controls the activation of an inflatable vehicle occupant restraint.

14. A seat occupant sensing system according to claim 12 wherein the controller controls the activation of a seat belt pretensioner.

15. A seat occupant sensing system comprising:
    (a) a seat having a seat support member and a seat pan member fastened to one another;
    (b) a frame disposed vertically above said seat pan in a spaced apart vertically juxtaposed relationship with said seat pan, said frame underlying a portion of a seat cushion, said portion of the seat cushion being spaced apart from a rear edge of the seat cushion; and
    (c) at least two sensors interposed between the frame and the seat pan such that all of the force transferred from the frame to the seat pan is transferred via said sensors which sense the magnitude of the force transferred therethrough and send signals to a device which processes said signals to determine the weight that said portion of the seat cushion is bearing.

16. A seat occupant sensing system according to claim 15 wherein the frame has a generally rectangular shape and a sensor is located in the vicinity of each corner of the frame.

17. A seat occupant sensing system comprising:
    (a) a seat having a seat support member and a seat pan member fastened to one another;
    (b) a frame disposed vertically above said seat pan in a spaced apart vertically juxtaposed relationship with said seat pan, said frame underlying a portion of a seat cushion, the frame and the seat pan being at least partially retained in said vertically juxtaposed relationship by a tension member;
    (c) at least two sensors interposed between the frame and the seat pan such that all of the force transferred from the frame to the seat pan is transferred via said sensors which sense the magnitude of the force transferred therethrough and send signals to a device which processes said signals to determine the weight that said portion of the seat cushion is bearing; and
    (d) a controller which processes a signal from said weight determining device to control the activation of at least one safety device for an occupant of said seat based upon said weight.

18. A seat occupant sensing system according to claim 17 wherein said tension member is a sheet material overlying the seat cushion and secured to the seat pan.

19. A seat occupant sensing system according to claim 17 wherein the controller controls the activation of an inflatable vehicle occupant restraint.

20. A seat occupant sensing system according to claim 17 wherein the controller controls the activation of a seat belt pretensioner.

21. A seat occupant sensing system according to claim 17 wherein the controller controls the activation of an inflatable vehicle occupant restraint and a seat belt pretensioner.

22. A seat occupant sensing system according to claim 17 wherein at least one of said sensors is a strain gauge.

23. A seat occupant sensing system according to claim 17 wherein at least one of said sensors is a load cell.

24. A seat occupant sensing system according to claim 17 wherein at least one of said sensors is a variable resistance pressure sensor.

25. A kit for retrofitting a vehicle seat with a seat occupant sensor system comprising a frame having a plurality of sensors mounted thereon in locations which correspond to a vertically uppermost surface of a vehicle seat pan and a device which processes signals from said systems to determine the weight that is located above and resting upon said frame.

* * * * *